United States Patent
Lifshitz et al.

(10) Patent No.: US 12,554,849 B2
(45) Date of Patent: Feb. 17, 2026

(54) DYNAMIC DATA SCAN FOR OBJECT STORAGE

(71) Applicant: Red Hat, Inc., Raleigh, NC (US)

(72) Inventors: Yuval Lifshitz, Ra'anana (IL); Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 345 days.

(21) Appl. No.: 17/681,114

(22) Filed: Feb. 25, 2022

(65) Prior Publication Data

US 2023/0273997 A1    Aug. 31, 2023

(51) Int. Cl.
    *G06F 21/56*    (2013.01)

(52) U.S. Cl.
    CPC .......... *G06F 21/565* (2013.01); *G06F 21/566* (2013.01); *G06F 21/568* (2013.01)

(58) Field of Classification Search
    CPC .... G06F 21/565; G06F 21/566; G06F 21/568; H04L 63/1441
    See application file for complete search history.

(56) References Cited

U.S. PATENT DOCUMENTS

| | | | | |
|---|---|---|---|---|
| 10,229,269 | B1 * | 3/2019 | Patton | G06F 21/554 |
| 10,346,610 | B1 | 7/2019 | Natanzon | |
| 10,469,525 | B2 * | 11/2019 | Hittel | G06F 21/552 |
| 10,516,688 | B2 * | 12/2019 | Tamir | G06F 11/3065 |
| 10,609,066 | B1 * | 3/2020 | Nossik | H04L 63/1408 |
| 10,819,738 | B2 * | 10/2020 | Saad | G06F 11/1453 |
| 11,023,327 | B2 * | 6/2021 | Linnen | G06F 11/1464 |
| 2021/0019403 | A1 * | 1/2021 | Mehta | G06N 3/045 |
| 2021/0019411 | A1 * | 1/2021 | Schmugar | G06F 21/554 |
| 2021/0400057 | A1 * | 12/2021 | Devane | H04L 63/1425 |
| 2023/0060606 | A1 * | 3/2023 | Dubey | G06F 21/602 |
| 2023/0169166 | A1 * | 6/2023 | Shachar | G06N 5/04 726/23 |

OTHER PUBLICATIONS

Igor Trubin: "Impact Session Spotlight: Catching Anomaly and Normality in Cloud by Neural Net and Entropy Calculation", Jan. 2019, 3 pages.

Lee et al.: "Machine Learning Based File entropy Analysis for Ransomware Detection in Backup Systems", Aug. 22, 2019, 11 pages.

Davies et al: "Differential Area Analysis for Ransomware Attack Detection within Mixed File Datasets", Jun. 28, 2021, 13 pages.

* cited by examiner

*Primary Examiner* — Zachary A. Davis

(74) *Attorney, Agent, or Firm* — Womble Bond Dickinson (US) LLP

(57) ABSTRACT

A first data object is received for storing in an object repository of a storage platform. An encryption value of the object repository is increased responsive to identifying that a current entropy level of the first data object exceeds a prior entropy level of the first data object by more than a first threshold value. Remediation is performed by a processing device on the object repository responsive to determining that the encryption value of the object repository exceeds a second threshold value.

20 Claims, 9 Drawing Sheets

DYNAMIC DATA SCAN FOR OBJECT STORAGE

TECHNICAL FIELD

Aspects of the present disclosure relate to storage platforms, and more particularly, to detecting attacks in storage platforms.

BACKGROUND

Malware is a term that refers to malicious software. Malware includes software that is designed with malicious intent to cause intentional harm and/or bypass security measures. Examples of malware include viruses, worms, ransomware, spyware, adware, rootkits and so forth. Malware causes many issues for users, including negatively affecting the resources of a computing device, invading user privacy by stealing information, adversely affecting computing device stability, and/or hijacking a computing device for illegitimate purposes. In many instances, users may not even be aware of the presence of the malware.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
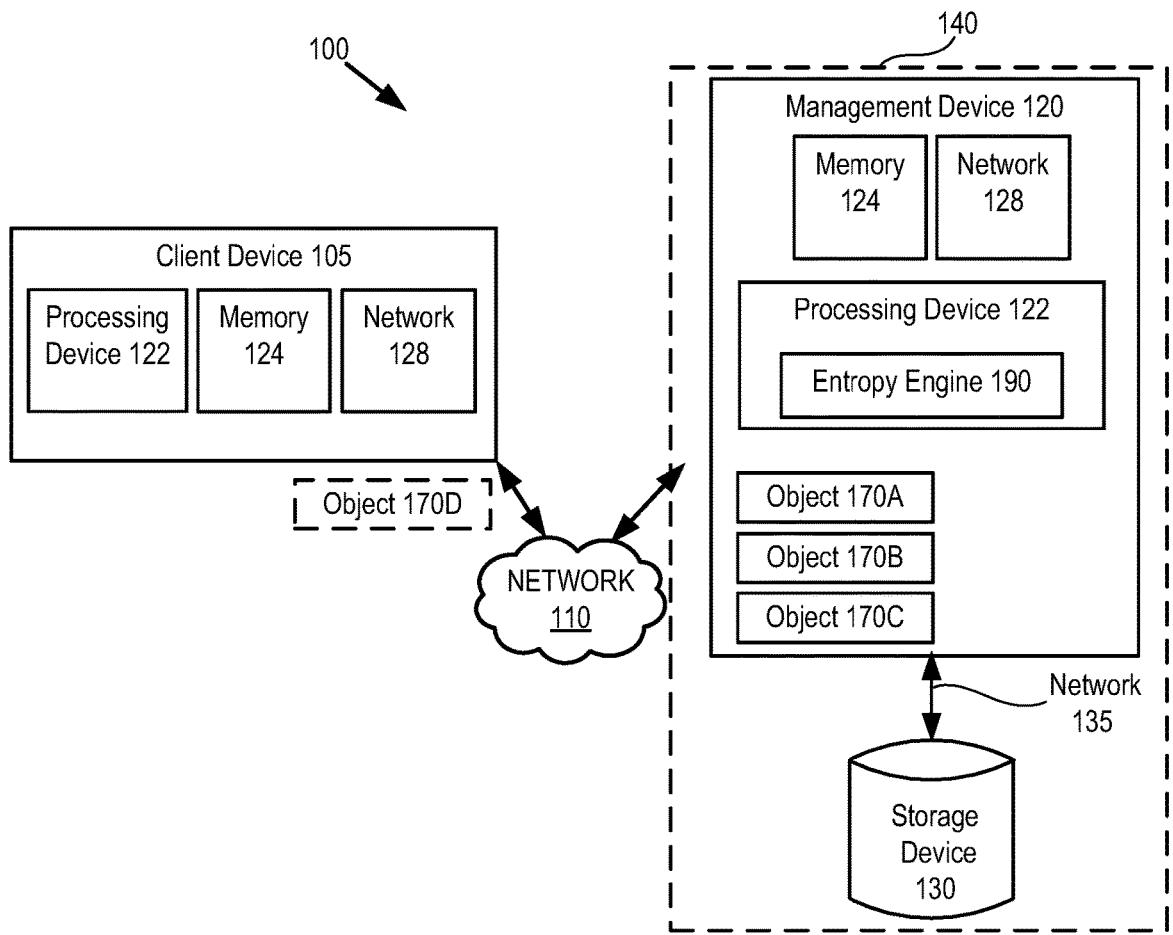
FIG. 1 is a block diagram that illustrates an example system, in accordance with some embodiments of the present disclosure.

Modern computer systems are subject to a large number of potential malware attacks. Examples of malware include ransomware, which can encrypt data on the infected system, rendering the data unreadable and unusable without a decryption key. In some cases, the key to decrypt the data may be provided to the user if a ransom is paid. In other cases, the data is simply lost. One option to guard against attacks such as ransomware includes storage systems that back up important data to a backup data storage device. While effective against some types of malware, other types of malware can also infect the backup data storage device, rendering both the current and backup copies of the data useless.

Solutions have been suggested for ransomware types of attacks. For example, some solutions attempt to identify signatures of the malware executables so as to identify an infected system. Such solutions have a number of issues. For example, the malware programs themselves are constantly shifting. This generates an arms race in which malware detection programs struggle to maintain an accurate set of identification signatures for malware that might be experienced. A system having such a malware detection program will be vulnerable to a new type or version of the malware until its signature is identified and updated into the malware detection program. Moreover, such a solution is less helpful in environments which share storage. In a shared storage environment, the entire shared storage is as vulnerable as the most vulnerable of its clients. Even if only a single client of the storage system is lacking such a malware detection program, the entire storage system may be compromised by the vulnerable client, despite the malware detection program executing on the other clients.

The present disclosure addresses the above-noted and other deficiencies by incorporating monitoring into the storage system. The monitoring may be performed as objects are being written to the storage system to identify data objects that may have been encrypted. In a common ransomware scenario, existing data files may be encrypted by an infected program. To address this scenario, the entropy level of a file that is being written can be analyzed and compared to the prior entropy level for the file. If the entropy level has changed beyond a threshold amount, the file may be marked as potentially being a subject of an involuntary encryption.

As used herein, involuntary encryption refers to a state in which a data object has been deliberately encrypted (e.g., by malware), but the encryption was done without the consent of the data object owner/user. An example of an involuntary encryption is ransomware in which a data object is encrypted without the permission of, and perhaps without the knowledge of, the owner/user of the data object. The types of involuntary encryption included in the present disclosure are not limited to ransomware and include, for example, malware that may encrypt files for destructive or other purposes (i.e., not necessarily for a ransom).

In some embodiments, it may be beneficial to perform an analysis for involuntary encryption at an object repository level. While an increase in entropy may signal that a file has been encrypted, the mere encryption of a file (or other action to otherwise increase its entropy) may not be sufficient to determine that an involuntary encryption has taken place. In many cases of malware, the malware may not only encrypt a single data object, but may encrypt all of the data objects in an object repository. By tracking a state of all and/or most of the data objects in an object repository, it may be determined that an involuntary encryption is taking place by detecting that the number of files in which entropy has increased has exceeded a particular threshold level.

As will be described further herein, once a particular object repository is identified as potentially being targeted by an involuntary encryption, operations may be performed to preserve the contents of the object repository. For example, if the object repository is a location for data backups, the backups may be preserved and/or moved. This may allow a system that is otherwise compromised by malware to be restored based on the backup files. By securing the data objects at the storage location, embodiments according to the present disclosure avoid the complications of attempting to detect the malware itself, instead remediating the consequences of the malware.

FIG. 1 is a block diagram that illustrates an example system 100, in accordance with some embodiments of the present disclosure. As illustrated in FIG. 1, the system 100 includes a client device 105, a storage platform 140, and a network 110. The storage platform 140 includes a management device 120 and a storage device 130. FIG. 1 and the other figures may use like reference numerals to identify like elements. A letter after a reference numeral, such as "170A," indicates that the text refers specifically to the element having that particular reference numeral. A reference numeral in the text without a following letter, such as "170," refers to any or all of the elements in the figures bearing that reference numeral.

The management device 120 (and client device 105) may include hardware such as processing device 122 (e.g., processors, central processing units (CPUs)), memory 124 (e.g., random access memory (RAM), hard-disk drive (HDD), and solid-state drives (SSD), etc.), network interfaces 128, and other hardware devices (e.g., sound card, video card, etc.).

The client device 105 and the management device 120 may be coupled to each other (e.g., may be operatively coupled, communicatively coupled, may communicate data/messages with each other) via network 110 utilizing network interfaces 128. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI' hotspot connected with the network 110 and/or a wireless carrier system that can be implemented using various data processing equipment, communication towers (e.g. cell towers), etc. The network 110 may carry communications (e.g., data, message, packets, frames, etc.) between client device 105 and management device 120. As used herein, the term "and/or" includes any and all combinations of one or more of the associated listed items.

The management device 120 and client device 105 may comprise any suitable type of computing device or machine that has a programmable processor including, for example, server computers, desktop computers, laptop computers, tablet computers, smartphones, set-top boxes, etc. In some examples, the management device 120 and client device 105 may respectively comprise a single machine or may include multiple interconnected machines (e.g., multiple servers configured in a cluster). The management device 120 and client device 105 may be implemented by a common entity/organization or may be implemented by different entities/organizations. For example, management device 120 may be operated by a first company/corporation and client device 105 may be operated by a second company/corporation. The management device 120 and client device 105 may each execute or include an operating system (OS). The operating systems of management device 120 and client device 105 may manage the execution of other components (e.g., software, applications, etc.) and/or may manage access to the hardware (e.g., processors, memory, storage devices etc.) of the computing device.

Management device 120 may be coupled to storage device 130 via network 135. Network 135 may be a public network (e.g., the internet), a private network (e.g., a local area network (LAN) or wide area network (WAN)), or a combination thereof. In one embodiment, network 135 may include a wired or a wireless infrastructure, which may be provided by one or more wireless communications systems, such as a WIFI™ hotspot connected with the network 135 and/or a wireless carrier system that can be implemented using various data processing equipment, communication towers (e.g. cell towers), etc. The network 135 may carry communications (e.g., data, message, packets, frames, etc.) between storage device 130 and management device 120. In some embodiments, the network 135 and the network 110 may be a same network or interconnected networks, but the embodiments of the present disclosure are not limited to such configurations. In some embodiments, the network 135 and the network 110 may be isolated from one another.

Though illustrated as a single element, storage device 130 may be or include a distributed storage network. In some embodiments, the storage device 130 may be or include a plurality and/or cluster of storage hardware, each including a server and a corresponding storage medium. In some embodiments, the storage device 130 may implement object storage on a single distributed computer cluster and provide integrated interfaces for at least one of: object-level, block-level, or file-level storage.

The storage platform 140 may store a plurality of data objects 170. In FIG. 1, data object 170A, data object 170B, and data object 170C are shown, but these are merely examples and are not intended to limit the embodiments of the present disclosure. The data objects 170 may represent unstructured data stored within storage platform 140. In some embodiments, the data of the data objects 170 may be stored within the storage device 130. In some embodiments, the data objects 170 may be further broken down in smaller portions or chunks for storage in the storage device 130.

In some embodiments, the data objects 170 of the storage platform 140 are provided for access (e.g., for reading/writing) to the client device 105. For example, the client device 105 may provide a data object 170D to the management device 120 of the storage platform 140 over the network 110. In some embodiments, the management device 120 may provide a gateway and/or application programming interface (e.g., API) accessible by the client device 105. The client device 105 may utilize the gateway and/or API to provide the data object 170D to the storage platform 140.

In response to receiving the data object 170D, the management device may analyze the data object 170D for storage into the storage device 130 of the storage platform 140. In some embodiments, the data object 170D may be a new data object 170D to be stored in the storage platform 140 or may be an update to an existing data object 170 that is already present on the storage platform 140 (e.g., stored in the storage device 130).

In some embodiments, data objects 170 may be discrete units of data that are stored in a structurally flat data environment. For example, there may be no or fewer folders, directories, or complex hierarchies as in a file-based system. In some embodiments, the data objects 170 may be stored on the storage platform 140 in one or more object repositories 180.

Figure 2:
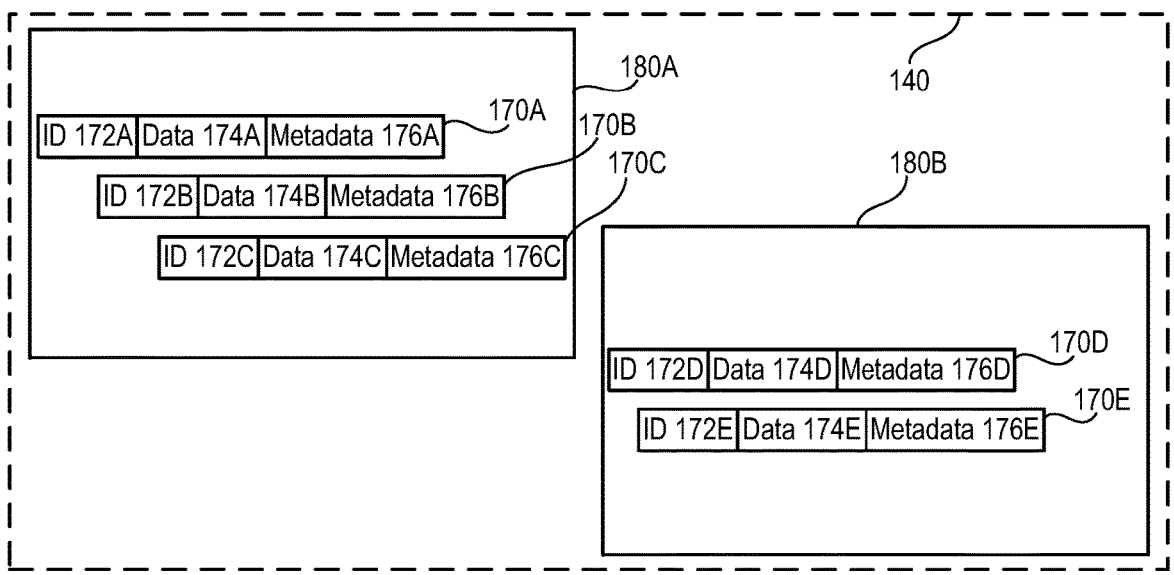
FIG. 2 is a block diagram that illustrates example object repositories, in accordance with some embodiments of the present disclosure.

FIG. 2 is a block diagram that illustrates example object repositories 180, in accordance with some embodiments of the present disclosure. In some embodiments, the object repository 180 may include a plurality of data objects 170. For example, a first object repository 180A may include a plurality of data objects 170A, 170B, and 170C and a second object repository 180B may include a plurality of data objects 170D, 170E. It will be understood that the object repository 180 may be a logical grouping rather than a physical separation and/or collection of the data objects 170 of the object repository 180.

Each data object 170 may be a self-contained data structure that includes the data 174 of the data object 170, metadata 176 (e.g., descriptive information and/or data associated with the data object 170), and a unique identifying ID number 172. This information may enable an application to locate and access the data object 170 within the object repository 180 and/or the storage platform 140. In some embodiments, the storage platform 140 may maintain replicas of object repository 180 for recovery purposes. Though two object repositories 180 are illustrated in FIG. 2, this is for example purposes only and is not intended to limit the embodiments of the present disclosure. Though the ID 172 and the metadata 176 are illustrated as being part of a cohesive data object 170, the embodiments of the present disclosure are not limited to such a configuration. In some embodiments, the metadata 176 may be stored separated from the data object 170. For example, the metadata 176 of the data objects 170 may be stored in and/or accessible by the management device 120.

In some embodiments, the data objects 170 may be immutable. In other words, the data objects 170 may be capable of being added or deleted from the object repository 180, but may not be edited. When the contents of an immutable data object 170 are to be edited, a new data object 170 is formed with the updated data 174 (and potentially a new ID 172) and the old data object 170 may be deleted, or may be saved as a previous version of the data object 170.

Referring back to FIG. 1, upon receipt of the data object 170D from the client device 105, the management device 120 may process the data object 170D for placement in an object repository 180 on the storage platform 140 (e.g., stored within storage device 130). As part of processing the data object 170D, the management device 120 may calculate an entropy level of the data 174 of the data object 170D.

The entropy level may measure randomness of subsequent bytes relative to preceding bytes in the data 174 of the data object 170. For example, a text document often exhibits a low level of entropy, while an encrypted or compressed version of the same text document may exhibit an increased level of entropy. A threshold may be implemented to define at what difference a change of entropy level (e.g., from a prior version of the data object 170 to the updated/edited version of the data object 170) may trigger a detection of an involuntary encryption.

One measure of entropy is known as Shannon Entropy, and is generally defined as:

$$H = -\sum_{1}^{n} P(i)\log_2 P(i)$$

where H is the entropy level (measured in bits), n is the number of bytes in the sample and P(i) is the probability of byte i appearing in the stream of bytes. The entropy value H is a measure of predictability of a given byte within the data object 170. The use of an entropy level in embodiments of the present disclosure include not only Shannon Entropy, but also other methods of calculating randomness of the data of a data object 170 understood by those of ordinary skill in the art. As used herein, a higher entropy level indicates a higher level of randomness between bits of the data of a data object 170. However, the embodiments of the present disclosure are not limited to such an interpretation. In some embodiments, a lower entropy level (depending on the measurement used) may indicate higher randomness.

The management device 120 may utilize processing device 122 to calculate the entropy level for the incoming data object 170D. For example, an entropy engine 190 may be executed (e.g., as executable code) to calculate the entropy level for the data 174 of the data object 170D. If the incoming data object 170D represents an update to an existing data object 170, the entropy engine 190 may compare the current entropy of the incoming data object 170D to a prior entropy of the data object 170 that is being updated to determine if a potential involuntary encryption has occurred. In some embodiments, as will be described further herein, the entropy engine 190 may make its determination based on a configuration of the object repository 180 in which the data object 170 is, or is to be, stored.

Figure 3:
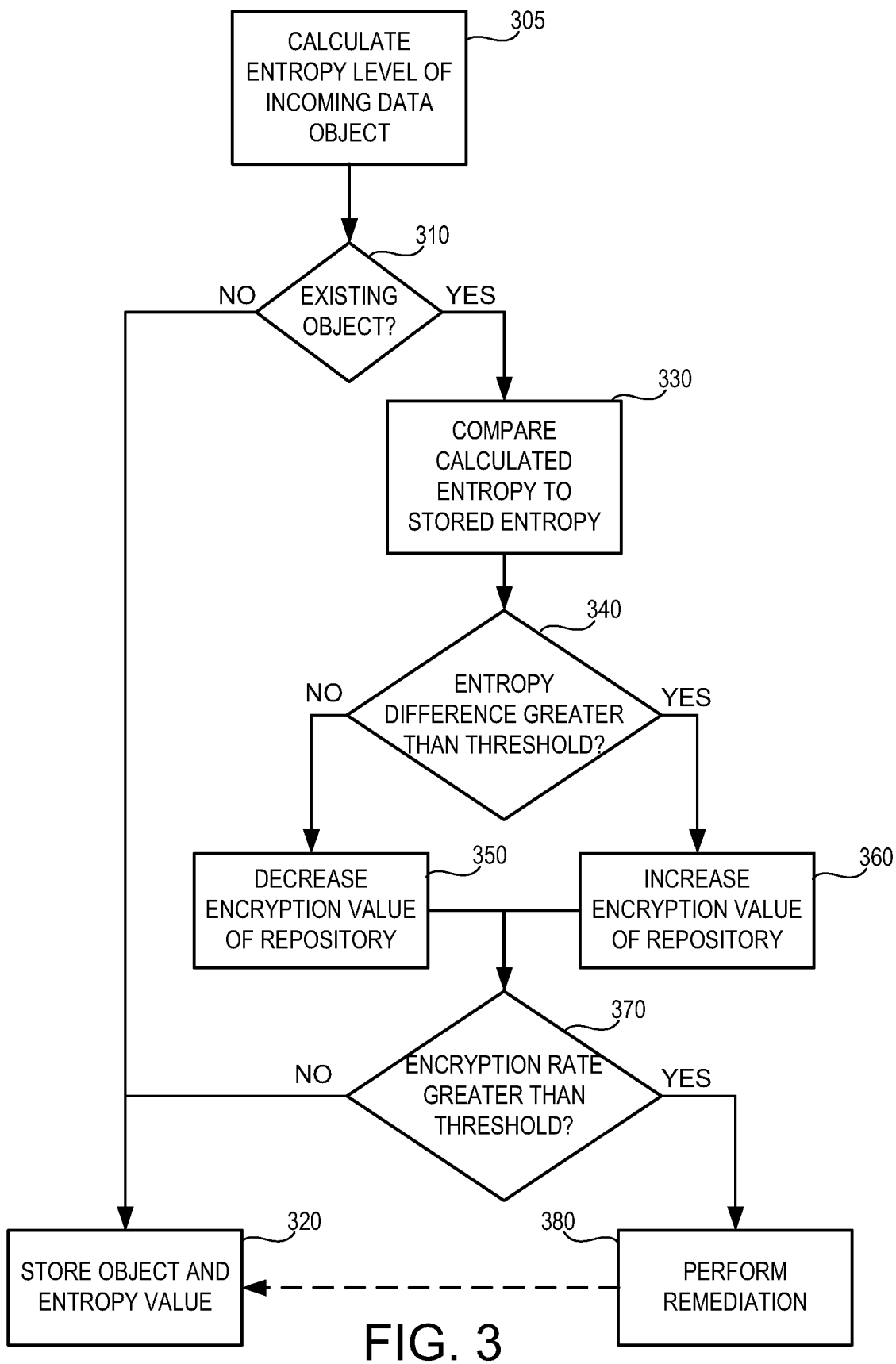
FIG. 3 illustrates an example flowchart for processing an incoming data object to determine the possibility of an involuntary encryption event, in accordance with some embodiments of the present disclosure.

FIG. 3 illustrates an example flowchart for processing an incoming data object 170 to determine the possibility of an involuntary encryption event, in accordance with some embodiments of the present disclosure. In some embodiments, the operations illustrated in FIG. 3 may be performed by the entropy engine 190 of FIG. 1 in response to receiving a data object 170 to be stored on storage platform 140.

Referring to FIGS. 1 and 3, operation 305 may include calculating an entropy level of the incoming data object 170. As described herein, calculating the entropy level may include calculating an amount of randomness between bit and/or bytes of data 174 of the incoming data object 170. In some embodiments, a higher entropy level of the data 174 of the incoming data object 170 may indicate a higher level of randomness within the data 174.

Operation 310 may include determining if the incoming data object 170 already exists in an object repository 180 of the storage platform 140. Determining whether the incoming data object 170 already exists may include identifying a location within the storage platform 140 at which the data object 170 is to be stored and/or whether the incoming data object 170 includes an update to an existing data object 170 within an object repository 180 of the storage platform 140.

If the incoming data object 170 does not already exist in the object repository 180 (operation 310:no), the data object 170 may be stored within the object repository 180 at operation 320. In some embodiments, the calculated entropy level for the data object 170 may also be stored as part of metadata 176 for the data object 170. Thus, the entropy level of the metadata 176 may indicate an entropy level of the data object 170 when the data object was stored in the object repository 180.

If the incoming data object 170 corresponds to a data object 170 that already exists in the object repository 180 (operation 310:yes), operation 330 may be performed in which the calculated entropy level for the incoming data object 170 is compared against a stored entropy level for the corresponding data object 170 within the object repository 180. For example, the prior entropy level for the data object 170 may be stored as part of the metadata 176 for the data object 170 that is being updated (e.g., as a result of a prior-executed operation 320). A difference may be calculated for the difference between the current entropy level of the incoming data object 170 and the prior entropy level of the data object 170 within the object repository 180 that is being updated.

At operation 340, the difference between the current entropy level of the incoming data object 170 and the prior entropy level of the data object 170 may be examined to determine if the difference exceeds a difference threshold value. The use of a difference threshold value may account for minor changes to the data object 170 that alter the randomness of the data 174 of the data object 170 but do not rise to the level of indicating encryption. In some embodiments, the difference threshold value may be configured by an administrator. A lower difference threshold value may result in more false positives in which an unencrypted data object 170 is identified as containing encrypted data, but may result in a more secure storage platform 140. Alternatively, a higher difference threshold value may result in fewer false positives, but may result in false negatives in which a data object 170 that has been encrypted is not identified as such.

If the difference between the current entropy level of the incoming data object 170 and the prior entropy level of the data object 170 exceeds the difference threshold value (operation 340:yes), an encryption rate (also referred to herein as an encryption value) for the object repository 180 containing the data object 170 may be increased (operation 360). The encryption rate may be a rate, or a perceived rate, at which data objects 170 within the object repository 180 are being encrypted. As recognized by the inventors, an involuntary encryption event is often performed on all data objects 170 within an object repository 180. Thus, while a single encryption event on a data object 170 may not necessarily indicate an involuntary encryption event, multiple encryptions performed on multiple data objects 170 may be indicative of such an involuntary encryption event. The encryption rate for the object repository 180 may track the detected encryptions for the object repository 180.

In some embodiments, if the difference between the current entropy level of the incoming data object 170 and the prior entropy level of the data object 170 does not exceed the difference threshold value (operation 340:no), the encryption rate for the object repository 180 containing the data object 170 may be decreased (operation 350). Thus, while the detection of an update to a data object 170 that appears encrypted may increase a likelihood that an involuntary encryption is taking place, an update to a data object 170 that does not appear to be encrypted may decrease the likelihood of an involuntary encryption. In some embodiments, the manipulation of the encryption rate may be controlled so that is does not go below zero.

At operation 370, the encryption rate may be examined to determine if the difference exceeds an encryption rate threshold value. The use of an encryption rate threshold value may indicate a relative level of encryption experienced within a single object repository 180 that may trigger a determination that an involuntary encryption is taking place. In some embodiments, the encryption rate threshold value may be configured by an administrator. A lower encryption rate threshold value may result in more false positives in which a series of update operations are identified as an involuntary encryption, but may actually be benign. Alternatively, a higher encryption rate threshold value may result in fewer false positives, but may result in more data objects 170 being encrypted before a true involuntary encryption event is recognized.

If the encryption rate for the object repository 180 does not exceed the encryption rate threshold value (operation 370:no), the data object 170 may be stored within the object repository 180 at operation 320. In some embodiments, the calculated entropy level for the data object 170 may also be stored as part of metadata 176 for the data object 170. Thus, a prior entropy level of the metadata 176 may be updated to reflect the new calculated entropy value for the data object 170.

If the encryption rate for the object repository 180 exceeds the encryption rate threshold value (operation 370: yes), remediation may be performed at operation 380. Remediation may include one or more options configured to alert an administrator and/or user to the possibility of an involuntary encryption and/or to protect the data objects 170 of the object repository 180. In some embodiments, after the remediation is performed, the data object 170 may be stored within the object repository 180 at operation 320. In some embodiments, the calculated entropy level for the data object 170 may also be stored as part of metadata 176 for the data object 170. Thus, a prior entropy level of the metadata 176 may be updated to reflect the new entropy value for the data object 170. The updating of the data object 170 after the encryption rate for the object repository 180 exceeds the encryption rate threshold value may be optional. In some embodiments, such updates may be blocked.

Figure 4A:
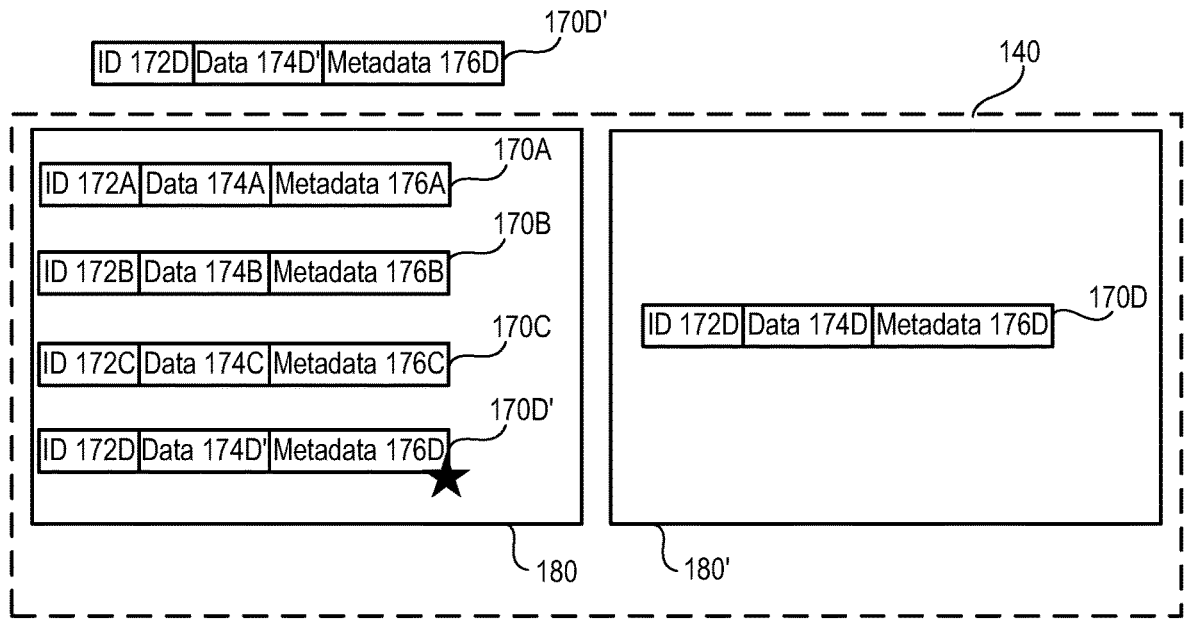
FIGS. 4A and 4B are schematic block diagrams illustrating examples of potential remediation operations that can be performed, in accordance with some embodiments of the present disclosure.
Figure 4B:
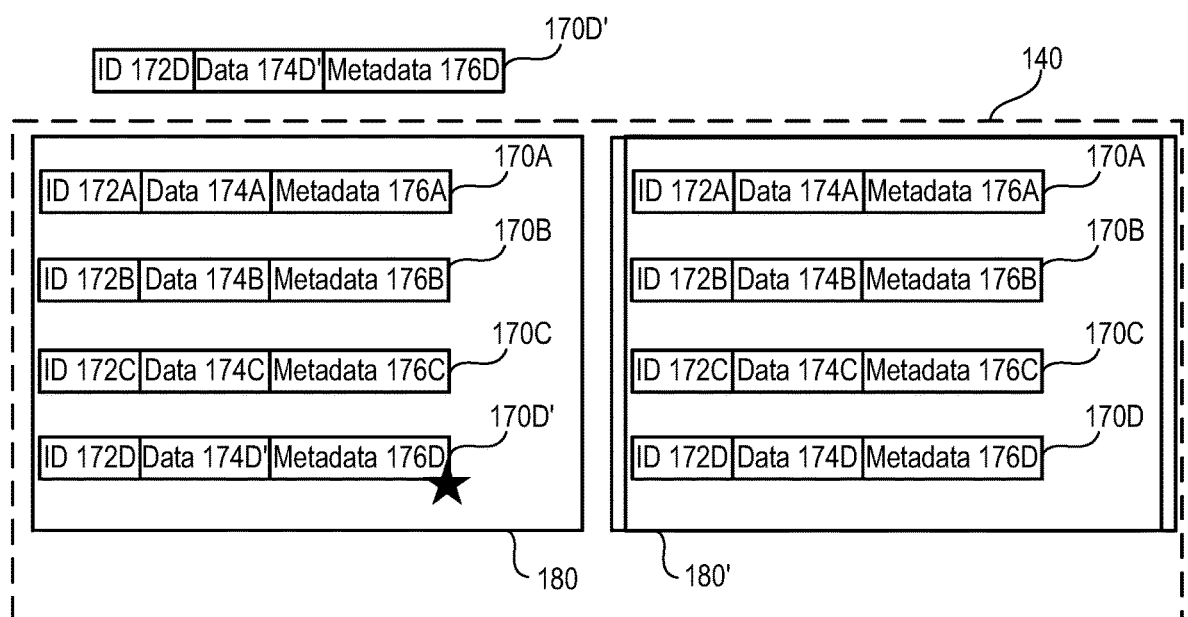

FIGS. 4A and 4B are schematic block diagrams illustrating examples of potential remediation that can be performed, in accordance with some embodiments of the present disclosure. A descriptions of elements of FIGS. 4A and 4B that have been described with respect to previous figures will be omitted for brevity. In FIGS. 4A and 4B, a scenario is assumed in which a modified data object 170D' is presented to the storage platform 140 (e.g., for writing in the storage device 130). The modified data object 170D' may correspond to a data object 170D that already exists in the object repository 180. The modified data object 170D' may include modified data 174D' that is modified from the data 174D of the data object 170D that already exists in the object repository 180.

As illustrated in FIG. 4A, remediation may include making a copy of the existing data object 170 before writing the modified data object 170D' into the object repository 180. In some embodiments, a secondary object repository 180' may be created and the copy of the existing data object 170D may be placed into the secondary object repository 180'. The secondary object repository 180' may thus contain a copy of the data object 170 prior to the occurrence of what is suspected to be an involuntary encryption event. In some embodiments, the modified data object 170D' may be written into the object repository 180 after the copy is performed to the secondary object repository 180'. Though the secondary object repository 180' is illustrated as a separate object repository 180 in FIG. 4A, this is merely an example. In some embodiments, the copy of the existing data object 170D may be formed within the same object repository 180. In some embodiments, permissions on the backup copy of the data object 170D may be set such that it requires elevated permissions to be accessed. In such a way, the backup copy of the original data object 170D may be protected from access by unprivileged users (e.g., accessible by administrators only).

FIG. 4B illustrates an additional embodiment for remediation in accordance with some embodiments of the present disclosure. In FIG. 4B, rather than just copying the data object 170D being modified, the entire object repository 180 (e.g., data objects 170A, 170B, 170C, and 170D) may be copied to the secondary object repository 180' in response to the modification of one of the data objects 170D. In some embodiments, it may be suspected that an object repository 180 that has exceeded its encryption rate is under attack. By copying all of the data objects 170 of the entire object repository 180, an advance copy can be made that is a snapshot of before, or in the early moments of, the attack.

FIGS. 4A and 4B are merely examples of types of remediation that can be used, and are not intended to limit the embodiments of the present disclosure. In some embodiments, the scenarios of FIGS. 4A and 4B may be combined under different circumstances. For example, in some embodiments a copy of a data object 170 may be made (e.g., as in FIG. 4A) every time that an update occurs that would cause a change in the entropy level for the data 174 of the data object 170 that exceeds the difference threshold value (operation 340:yes of FIG. 3). In addition, a copy of the entire object repository 180 may be made (e.g., as in FIG. 4B) every time that an update occurs that would cause an encryption rate of the object repository 180 to exceed the encryption rate threshold value (operation 370:yes of FIG. 3). In some embodiments, multiple copies may be made across multiple updates so as to track different versions of the modified data object 170.

Though FIGS. 4A and 4B described types of remediation that may involve copies of files, these are not the only types of remediation (e.g., operation 380 of FIG. 3) that may be used. Other types of remediation may be used instead of, or in addition to, the remediation illustrated in FIGS. 4A and 4B. In some embodiments, remediation may involve the generation and transmission of an alert. The alert may be sent, for example, to data security personnel or otherwise broadcast. In some embodiments, remediation may involve blocking access to the object repository 180. For example, write access to the object repository 180 may be blocked. In some embodiments, remediation may involve rate-limiting the access to the object repository 180 such the processing of updates to the data objects 170 are deliberately slowed. Other methods of remediation to address what is suspected to be an involuntary encryption event that are understood by those of ordinary skill in the art may also be performed.

Figure 5:
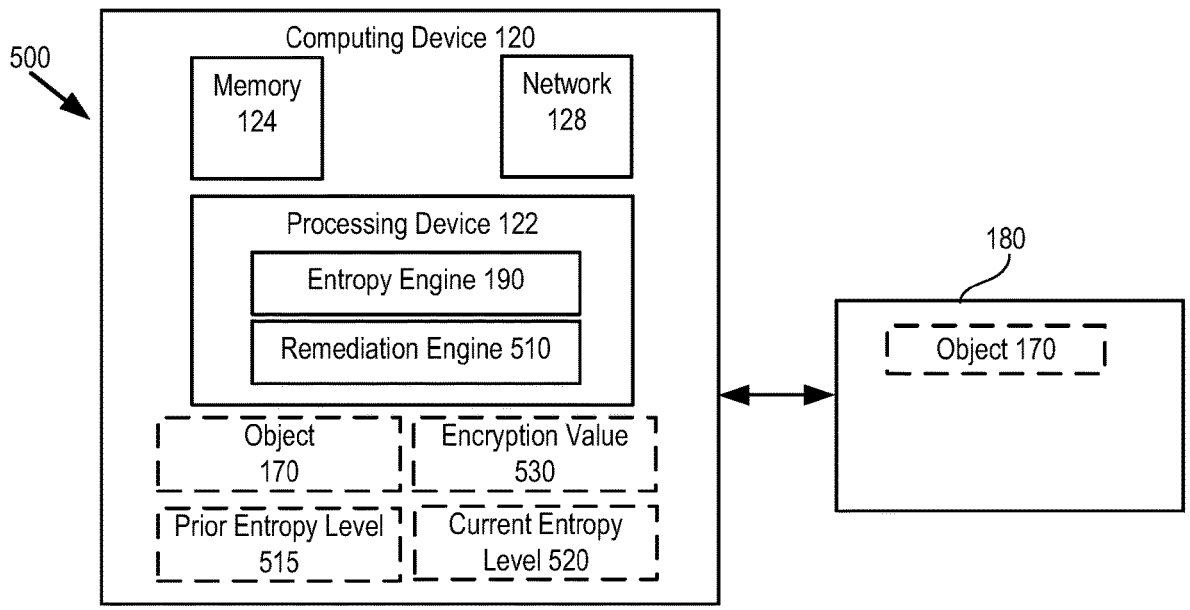
FIG. 5 is a component diagram of an example of a device architecture, in accordance with embodiments of the disclosure.

FIG. 5 is a component diagram of an example of a device architecture 500, in accordance with embodiments of the disclosure. The device architecture 500 includes a computing device 120 having memory 124, network interface 128, and processing device 122 of FIG. 1. The computing device 120 of FIG. 5 may be similar to the management device 120 of FIG. 1 and, as such, a duplicate description thereof will be omitted.

The computing device 120 may receive a data object 170 for storage in an object repository 180. In embodiments, the object repository 180 and data object 170 may correspond to object repository 180 and data object 170 of FIGS. 1, 2, 4A and 4B, respectively. It should be noted that the data object 170 is shown for illustrative purposes only and is not a physical component of computing device 120.

The computing device 120 may include an entropy engine 190 configured to calculate a current entropy level 520 of the received data object 170 and compare the current entropy level 520 to a prior entropy level 525 of the data object 170. In some embodiments, the prior entropy level 515 of the data object 170 may be obtained from metadata 176 associated with the data object 170 (see, e.g., FIG. 2). In embodiments, the entropy engine 190 may correspond to the entropy engine 190 of FIG. 1. In some embodiments, the current entropy level 520 and prior entropy level 515 may correspond to the prior and current entropy levels of the data objects 170 discussed herein with respect to FIGS. 1, 2, 3, 4A and 4B. It should be noted that the entropy levels 515, 520 are shown for illustrative purposes only and are not physical components of computing device 120.

The computing device 120 may increase an encryption value 530 of the object repository 180 responsive to determining that the current entropy level 520 exceeds the prior entropy level 515 of the data object 170 by more than a first threshold value. In some embodiments, the encryption value 530 may correspond to the encryption rate/value discussed herein with respect to FIGS. 1, 2, 3, 4A and 4B. It should be noted that the encryption value 530 is shown for illustrative purposes only and is not a physical component of computing device 120.

The computing device 120 may include a remediation engine 510 configured to perform remediation on the object repository 180 responsive to determining that the encryption value 530 of the object repository 180 exceeds a second threshold value. In some embodiments, the remediation engine 510 may be executable code configured to perform the remediation operations discussed herein with respect to FIGS. 3, 4A and 4B.

Computing device 150 may include a memory 124 that is operatively coupled to processing device 122. In embodiments, memory 124 may include volatile memory devices (e.g., random access memory (RAM)), non-volatile memory devices (e.g., flash memory) and/or other types of memory devices. The entropy engine 190 and the remediation engine 510 may include executable computer-readable program instructions that may be stored in memory 124 and loaded on processing device 122 to execute operations described herein.

Figure 6:
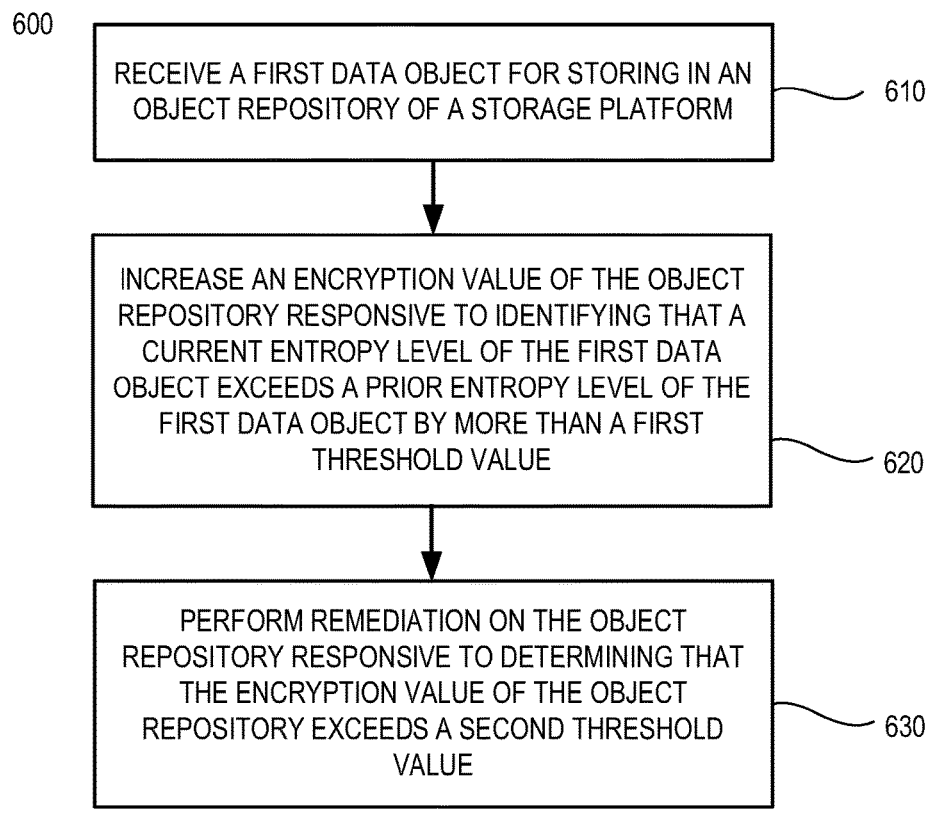
FIG. 6 is a flow diagram of a method for performing a data scan of a data object stored in an object repository, in accordance with some embodiments of the present disclosure.

FIG. 6 is a flow diagram of a method 600 for performing a data scan of a data object 170 stored in an object repository 180, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., management/computing device 120 illustrated in FIGS. 1 and 5).

Referring simultaneously to FIG. 5 as well, the method 600 begins at block 610, in which a first data object 170 may be received for storing in an object repository 180 of a storage platform 140. In some embodiments, the first data object 170 is an immutable data object. In some embodiments, the object repository 180 comprises a plurality of data objects 170. In some embodiments, the first data object 170 corresponds to an update to be performed on a second data object 170 stored within the object repository 180.

At block 620, an encryption value 530 of the object repository 180 may be increased responsive to identifying that a current entropy level 520 of the first data object 170 exceeds the prior entropy level 515 of the first data object 170 by more than a first threshold value. In some embodiments, the prior entropy level 515 is stored as part of metadata 176 associated with a second data object 170 being updated by the first data object 170. In some embodiments, a higher current entropy level 520 of the first data object 170 corresponds to a higher level of randomness in data of the first data object 170.

At block 630, remediation may be performed on the object repository 180 responsive to determining that the encryption value 530 of the object repository 180 exceeds a second threshold value. In some embodiments, performing the remediation on the object repository includes creating a copy of the second data object 170 being updated by the first data object 170 prior to storing the first data object 170 in the object repository 180. In some embodiments, performing the remediation on the object repository 180 comprises creating a copy of each of the data objects 170 of the object repository 180 prior to storing the first data object 170 in the object repository 180. In some embodiments, performing the remediation on the object repository 180 comprises locking the object repository 180 for further write access. In some embodiments, performing the remediation on the object repository 180 comprises transmitting an alert to an administrator of the storage platform 140.

Figure 7:
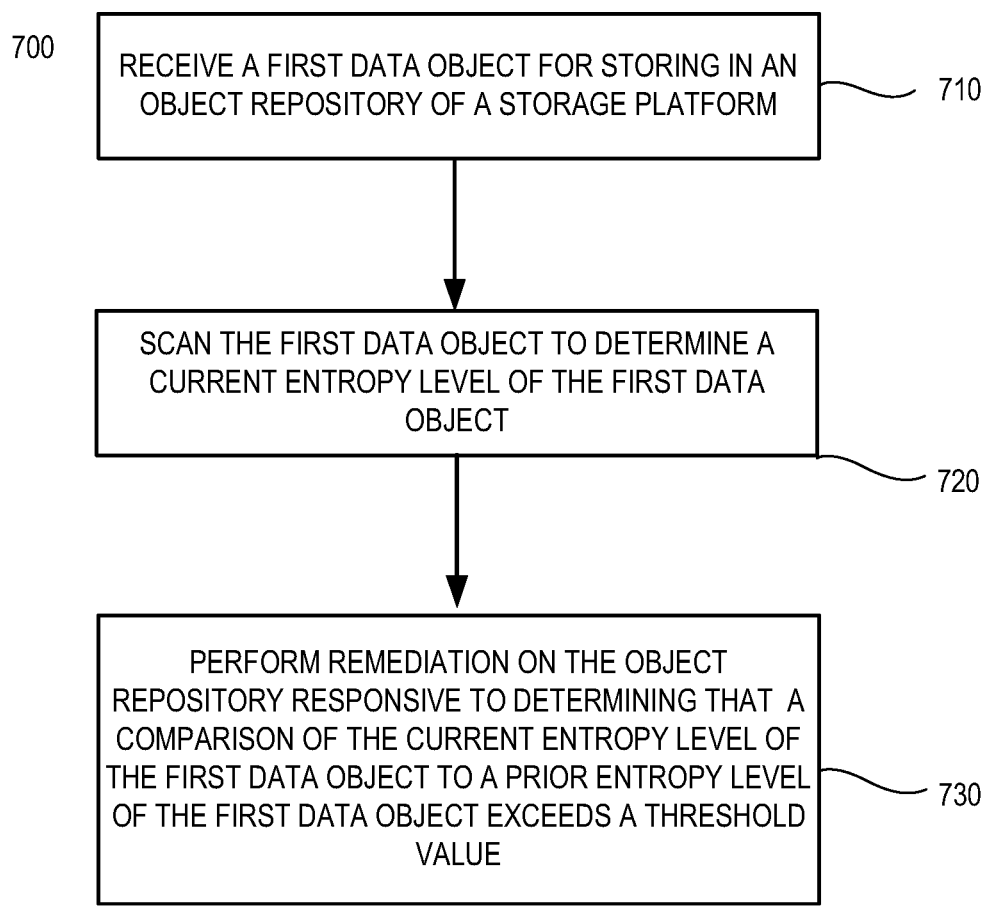
FIG. 7 is a flow diagram of a method for performing a data scan of a stored data object, in accordance with some embodiments of the present disclosure.

FIG. 7 is a flow diagram of a method 700 for performing a data scan of a stored data object 170, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a computing device (e.g., management/computing device 120 illustrated in FIGS. 1 and 5).

Referring simultaneously to FIG. 5 as well, the method 700 begins at block 710, in which a first data object 170 may be received for storing in an object repository 180 of a storage platform 140. In some embodiments, the first data object 170 is an immutable data object. In some embodiments, the object repository 180 includes a plurality of data objects 170. In some embodiments, the first data object 170 corresponds to an update to be performed on a second data object 170 stored within the object repository 180.

At block 720, the first data object 170 may be scanned to determine a current entropy level 520 of the first data object 170.

At block 730, remediation may be performed on the object repository 180 responsive to determining that a comparison of the current entropy level 520 of the first data object 170 to a prior entropy level 515 of the first data object 170 exceeds a threshold value. In some embodiments, an encryption value of the object repository may be increased responsive to identifying that the current entropy level is greater than the prior entropy level. In some embodiments, the prior entropy level 515 is stored as part of metadata 176 associated with a second data object 170 being updated by the first data object 170. In some embodiments, a higher current entropy level 520 of the first data object 170 corresponds to a higher level of randomness in data of the first data object 170. In some embodiments, performing the remediation on the object repository includes creating a copy of the second data object 170 being updated by the first data object 170 prior to storing the first data object 170 in the object repository 180. In some embodiments, performing the remediation on the object repository 180 comprises creating a copy of each of the data objects 170 of the object repository 180 prior to storing the first data object 170 in the object repository 180. In some embodiments, performing the remediation on the object repository 180 comprises locking the object repository 180 for further write access. In some embodiments, performing the remediation on the object repository 180 comprises transmitting an alert to an administrator of the storage platform 140.

Figure 8:
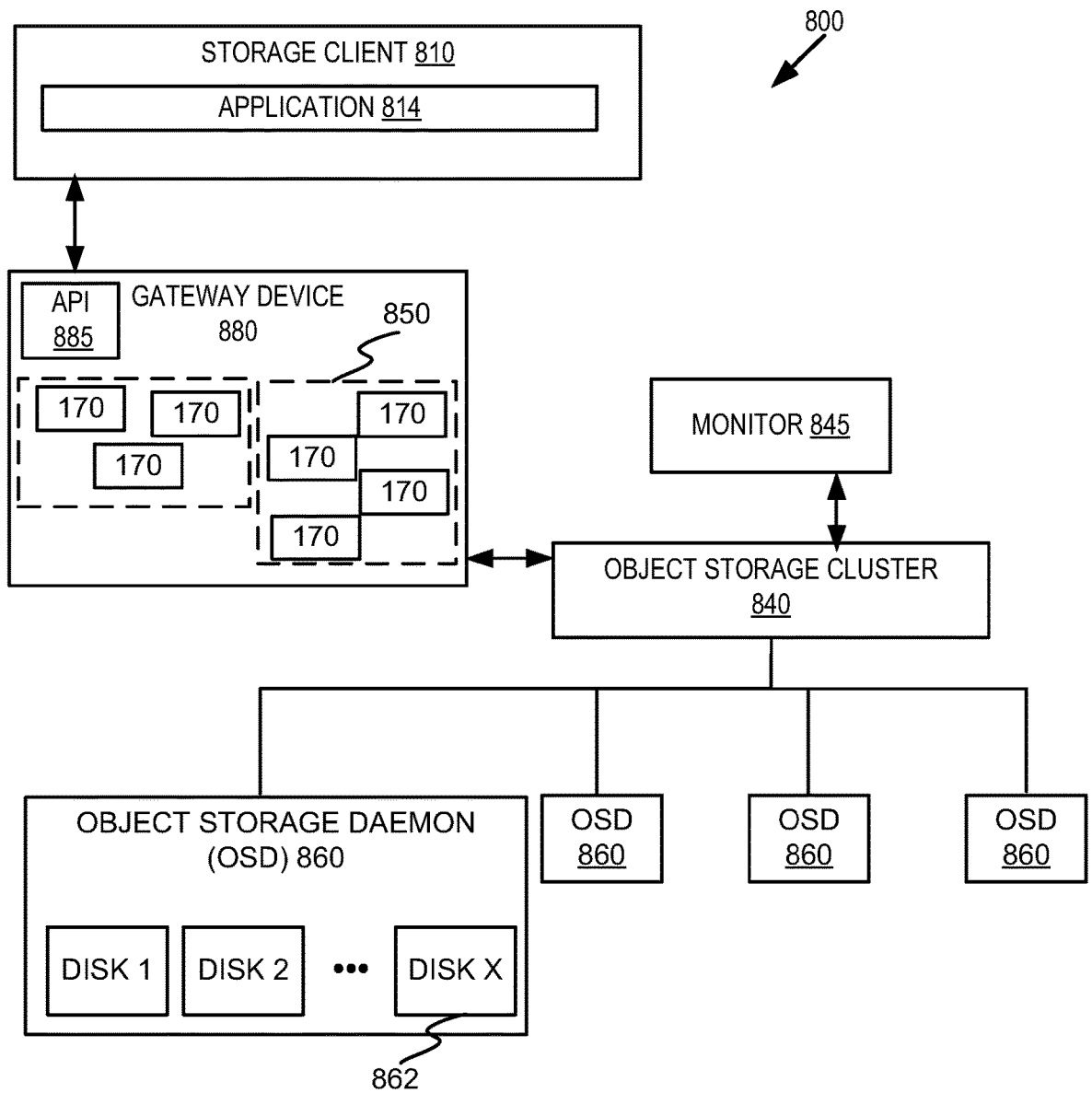
FIG. 8 is a block diagram that illustrates an example data storage system, in accordance with some embodiments of the present disclosure.

In some embodiments, the storage platform may include a storage platform based on CEPH™. Ceph is an open-source software storage platform that implements data object storage on a distributed computer cluster. Ceph provides 3-in-1 interfaces for object-, block- and file-level storage. FIG. 8 is a block diagram that illustrates an example data storage system 800, in accordance with some embodiments of the present disclosure.

Referring to FIG. 8, the system 800 based on Ceph may include multiple elements: storage clients 810, which may be users of the data objects 170 being stored (e.g., making read and/or write requests of the data objects 170), an object storage cluster 840, which may store both data 174 and metadata 176 of the data objects 170, a cluster monitor 845 (also referred to herein as a monitor server 845), which may communicate with the object storage cluster 840 to implement a monitoring functions for the data storage system 800, and a gateway device 880, which may communicate with the object storage cluster 840 to manage data objects 170. The elements of FIG. 8 are merely examples, and other elements of a Ceph-based system may be present without deviating from the embodiments of the present disclosure.

The storage client 810 may include user applications 814. In some embodiments, the user applications 814 may access the gateway device 880 to manipulate data objects 170. For example, the gateway device 880 may provide an Application Programming Interface (API) 885 to which the user application 814 may connect. In some embodiments, the API 885 may be a representation state transfer (REST)-based API 885. In some embodiments, the gateway device 880 may provide a reliable autonomic distributed object store (RADOS) gateway. In some embodiments, the gateway device 880 may be the same or similar to management device 120 described herein with respect to FIG. 1 and other figures. The gateway device 880 may maintain the data objects 170 in buckets 850. The buckets 850 may be similar to the object repositories 180 described herein.

In some embodiments, the object storage cluster 840 may manage reading and writing of the incoming data objects 170. For example, the data objects 170 of the gateway device 880 may be distributed to the object storage cluster 840. The monitor 845 may track the health of the object storage cluster 840 and the storage devices therein. The monitor 845 may maintain a map of information for each component (e.g., in a cluster map).

In some embodiments, the object storage cluster 840 may be implemented as a plurality of servers, each running one or more object storage daemons (OSDs) 860. In some embodiments, the object storage cluster 840 may store the data objects 170 of the gateway device 880 in a distributed format such that portions of the data object 170 are distributed to different ones of the OSDs 860.

The OSD 860 may store data objects 170 for the storage client 810 in one or more physical disks 862, which may take on any form, such as hard drives, solid state drives, or the like. As described herein, the data objects 170 may be broken into smaller pieces and distributed across the plurality of OSDs 860. In some embodiments, the data objects 170 may be replicated (e.g., copied) across one or more of the plurality of OSDs.

As described herein, monitoring for an involuntary encryption event may be performed for an object repository. In some embodiments, where data objects 170 are stored in a bucket 850, such as with a RADOS gateway 880 backed by Ceph-based storage, the bucket 850 may serve as the object repository 180. For example, in some embodiments, the gateway device 880 may contain an entropy engine 190 (see FIG. 1) to monitor any incoming data objects 170 for a change in entropy level. As discussed herein, an encryption rate may be maintained for each of the buckets 850 and, when the encryption rate is exceeded, a remediation operation may be performed on the bucket 850 (e.g., on all of the data objects of the bucket 850), as described herein with respect to FIGS. 4A and 4B.

Figure 9A:
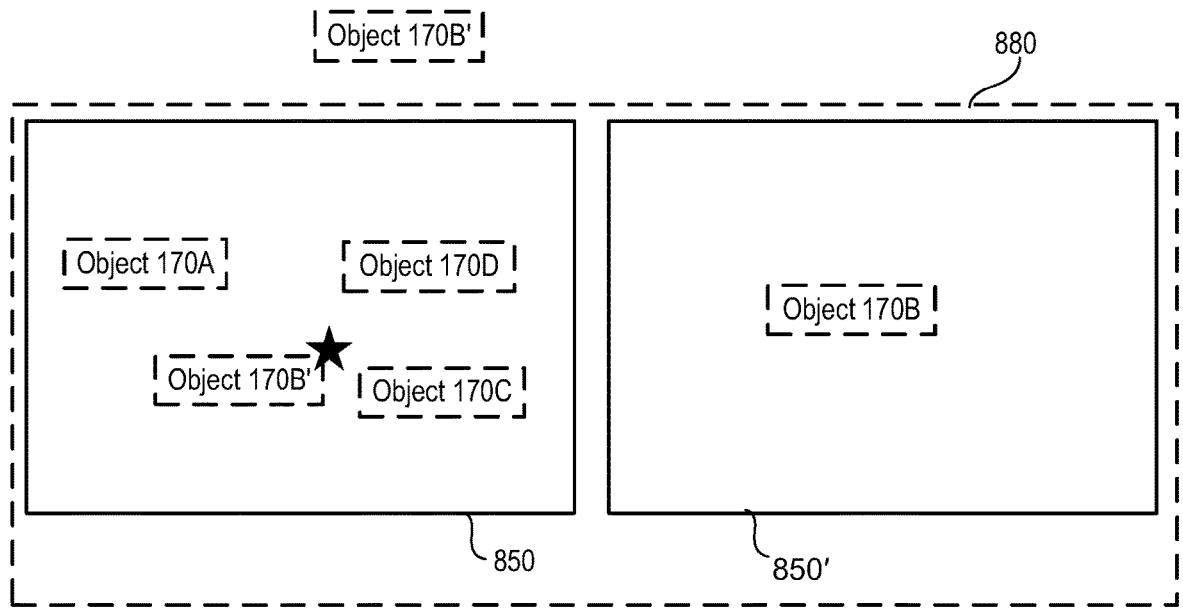
FIGS. 9A and 9B are schematic block diagrams illustrating examples of potential remediation operations that can be performed with bucket-based object storage, in accordance with some embodiments of the present disclosure.
Figure 9B:
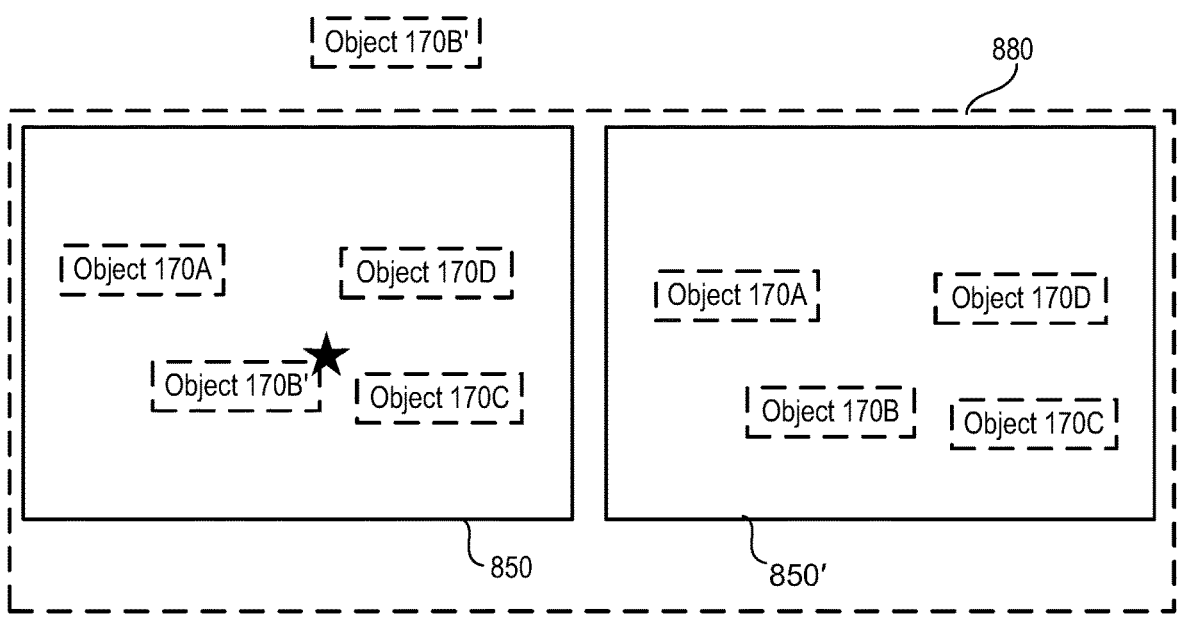

FIGS. 9A and 9B are schematic block diagrams illustrating examples of potential remediation operations that can be performed with bucket-based object storage, in accordance with some embodiments of the present disclosure. A descriptions of elements of FIGS. 9A and 9B that have been described with respect to previous figures will be omitted for brevity. In FIGS. 9A and 9B, a scenario is assumed in which a modified data object 170B' is presented to the gateway device 880 (e.g., for writing in the object storage cluster 840). The modified data object 170B' may correspond to a data object 170B that already exists in the gateway device 880 (e.g., stored within the object storage cluster 840). The modified data object 170B' may include modified data 174B' that is modified from the data 174B of the data object 170B that already exists in a bucket 850 of the gateway device 880 (e.g., stored within the object storage cluster 840).

As illustrated in FIG. 9A, remediation may include making a copy of the existing data object 170B before writing the modified data object 170B' into the gateway device 880 for a given bucket 850. In some embodiments, a secondary bucket 850' may be created and the copy of the existing data object 170B may be placed into the secondary bucket 850'. The secondary bucket 850' may thus contain a copy of the data object 170B prior to the occurrence of what is suspected to be an involuntary encryption event. Though the secondary bucket 850' is illustrated as a separate bucket 850' in FIG. 9A, this is merely an example. In some embodiments, the copy of the existing data object 170B may be formed within the bucket 850. In some embodiments, permissions on the backup copy of the data object 170B may be set such that it requires elevated permissions to be accessed. In such a way, the backup copy of the original data object 170B may be protected from access by unprivileged users (e.g., accessible by administrators only).

FIG. 9B illustrates an additional embodiment for remediation in accordance with some embodiments of the present disclosure. In FIG. 9B, rather than just copying the data object 170B being modified, the entire bucket 850 (e.g., data objects 170A, 170B, 170C, and 170D) may be copied to the secondary bucket 850' in response to the modification of one of the data objects 170B. In some embodiments, it may be suspected that bucket 850 is under attack in view of its encryption rate. By copying the entire bucket 850, an advance copy can be made that is a snapshot of before, or in the early moments of the attack.

FIGS. 9A and 9B are merely examples of types of remediation that can be used, and are not intended to limit the embodiments of the present disclosure. In some embodiments, the scenarios of FIGS. 9A and 9B may be combined under different circumstances. For example, in some embodiments a copy of a data object 170 may be made (e.g., as in FIG. 9A) every time that an update occurs that would cause a change in the entropy level for the data 174 of the data object 170 that exceeds the difference threshold value (operation 340:yes of FIG. 3). In addition, a copy of the entire bucket 850 may be made (e.g., as in FIG. 9B) every time that an update occurs that would cause an encryption rate of the bucket 850 to exceed the encryption rate threshold value (operation 370:yes of FIG. 3). In some embodiments, multiple copies may be made across multiple updates so as to track different versions of the modified data object 170.

Though FIGS. 9A and 9B include examples of remediation operations that can be performed in a configuration in which a bucket 850 is maintained as an object repository 180, the embodiments of the present disclosure are not limited to such a configuration. It will also be understood that the additional remediation options described herein (e.g., alerts, access blockage, rate limiting, and the like) would also be possible instead of, or in addition to, the operations described in FIGS. 9A and 9B.

Figure 10:
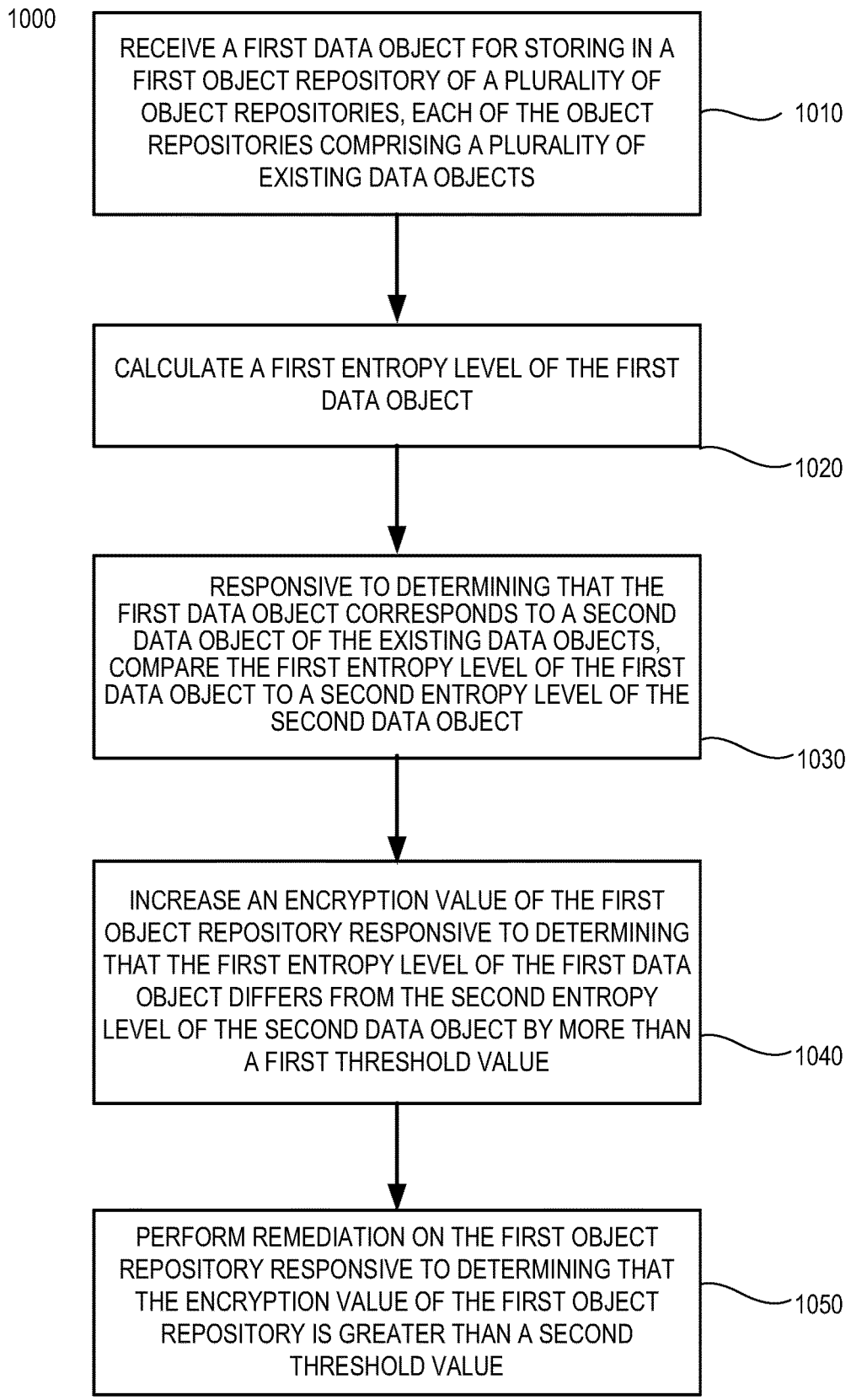
FIG. 10 is a flow diagram of a method for performing a data scan of object storage, in accordance with some embodiments of the present disclosure.

FIG. 10 is a flow diagram of a method 1000 for performing a data scan of object storage, in accordance with some embodiments of the present disclosure. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1000 may be performed by a computing device (e.g., management/computing device 120 illustrated in FIGS. 1 and 5 and/or the gateway device 880 of FIG. 8).

Referring to FIG. 10 as well as the prior figures, the method 1000 begins at block 1010, in which a first data object 170 may be received for storing in a first object repository 180, 850 of a plurality of object repositories 180, 850, each of the object repositories 180, 850 including a plurality of existing data objects 170. In some embodiments, the first data object 170 is an immutable data object. In some embodiments, each of the plurality of object repositories includes a plurality of data objects distributed among a plurality of OSDs, and the first data object comprises a modification to a second data object of the plurality of data objects of one of the plurality of object repositories At block 1020, a first entropy level 520 of the first data object 170 may be calculated. In some embodiments, the first entropy level 520 may be calculated using Shannon entropy.

At block 1030, responsive to determining that the first data object 170 corresponds to a second data object 170 of the existing data objects 170, the first entropy level 520 of the first data object 170 may be compared to a second entropy level 515 of the second data object 170. In some embodiments, the second entropy level 515 is stored as part of metadata 176 associated with the second data object 170.

At block 1040, an encryption value of the first object repository 180, 850 may be increased responsive to determining that the first entropy level 520 of the first data object 170 differs from the second entropy level 515 of the second data object 170 by more than a first threshold value.

At block 1050, remediation is performed on the first object repository 180, 850 responsive to determining that the encryption value of the first object repository 180, 850 is greater than a second threshold value. In some embodiments, performing the remediation on the first object repository includes creating a copy of the second data object 170 being updated by the first data object 170 prior to storing the first data object 170 in the first object repository 180, 850. In some embodiments, performing the remediation on the first object repository 180, 850 comprises creating a copy of the existing data objects 170 of the first object repository 180, 850 prior to storing the first data object 170 in the first object repository 180, 850. In some embodiments, performing the remediation on the first object repository 180, 850 comprises locking the first object repository 180, 850 for further write access. In some embodiments, performing the remediation on the first object repository 180, 850 comprises transmitting an alert to an administrator of the storage platform 140.

Figure 11:
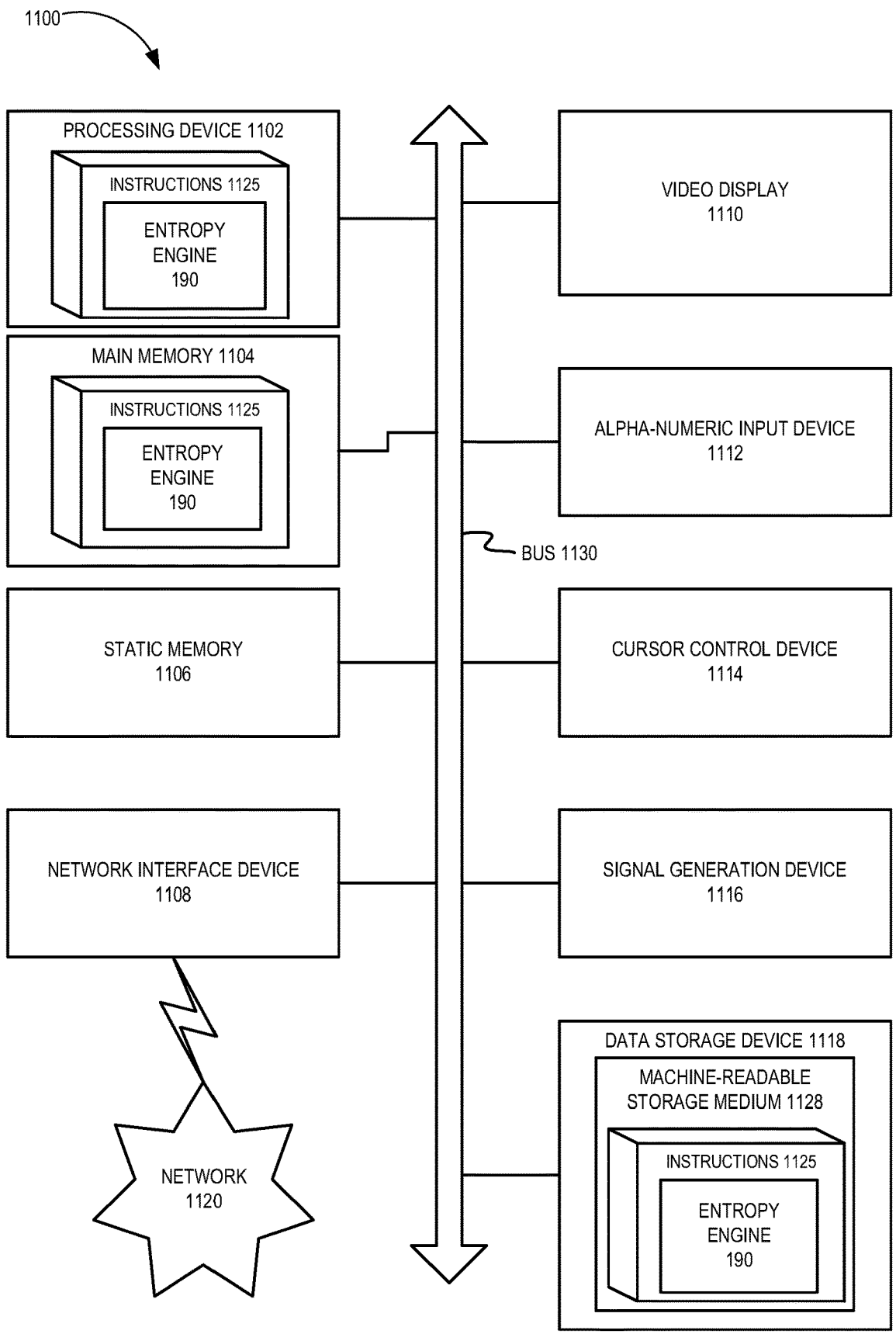
FIG. 11 is a block diagram of an example computing device that may perform one or more of the operations described herein, in accordance with some embodiments of the disclosure.

FIG. 11 is a block diagram of an example computing device 1100 that may perform one or more of the operations described herein, in accordance with some embodiments of the disclosure. Computing device 1100 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1100 may include a processing device (e.g., a general purpose processor, a PLD, etc.) 1102, a main memory 1104 (e.g., synchronous dynamic random access memory (DRAM), read-only memory (ROM)), a static memory 1106 (e.g., flash memory and a data storage device 1118), which may communicate with each other via a bus 1130.

Processing device 1102 may be provided by one or more general-purpose processing devices such as a microprocessor, central processing unit, or the like. In an illustrative example, processing device 1102 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1102 may also include one or more special-purpose processing devices such as an application specific integrated circuit (ASIC), a field programmable gate array (FPGA), a digital signal processor (DSP), network processor, or the like. The processing device 1102 may execute the operations described herein, in accordance with one or more aspects of the present disclosure, for performing the operations and steps discussed herein.

Computing device 1100 may further include a network interface device 1108 which may communicate with a network 1120. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse) and an acoustic signal generation device 1116 (e.g., a speaker). In one embodiment, video display unit 1110, alphanumeric input device 1112, and cursor control device 1114 may be combined into a single component or device (e.g., an LCD touch screen).

Data storage device 1118 may include a computer-readable storage medium 1128 on which may be stored one or more sets of instructions 1125 that may include instructions for a container engine, e.g., entropy engine 190 (and/or remediation engine 510) for carrying out the operations described herein, in accordance with one or more aspects of the present disclosure. Instructions 1125 may also reside, completely or at least partially, within main memory 1104 and/or within processing device 1102 during execution thereof by computing device 1100, main memory 1104 and processing device 1102 also constituting computer-readable media. The instructions 1125 may further be transmitted or received over a network 1120 via network interface device 1108.

While computer-readable storage medium 1128 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: receiving a first data object for storing in an object repository of a storage platform; increasing an encryption value of the object repository responsive to identifying that a current entropy level of the first data object exceeds a prior entropy level of the first data object by more than a first threshold value; and performing, by a processing device, remediation on the object repository responsive to determining that the encryption value of the object repository exceeds a second threshold value.

Example 2 is the method of Example 1, wherein the first data object corresponds to an update to be performed on a second data object stored within the object repository, and wherein performing the remediation on the object repository comprises creating a copy of the second data object prior to storing the first data object in the object repository.

Example 3 is the method of any of Examples 1-2, wherein the object repository comprises a plurality of data objects, and wherein performing the remediation on the object repository comprises creating a copy of each of the data objects of the object repository prior to storing the first data object in the object repository.

Example 4 is the method of any of Examples 1-3, wherein performing the remediation on the object repository comprises locking the object repository for further write access.

Example 5 is the method of any of Examples 1-4, wherein the first data object corresponds to an update to be performed on a second data object stored within the object repository, and wherein the prior entropy level is stored as part of metadata associated with the second data object.

Example 6 is the method of any of Examples 1-5, wherein the first data object is an immutable data object.

Example 7 is the method of any of Examples 1-6, wherein the object repository is a plurality of object repositories, each of the object repositories comprising a plurality of object storage daemons (OSDs), wherein each of the plurality of OSDs comprises a plurality of data objects, and wherein the first data object comprises a modification to a second data object of the plurality of data objects of one of the plurality of OSDs.

Example 8 is the method of any of Examples 1-7, wherein performing the remediation on the object repository comprises transmitting an alert to an administrator of the storage platform.

Example 9 is the method of any of Examples 1-8, wherein a higher current entropy level of the first data object corresponds to a higher level of randomness in data of the first data object.

Example 10 is a system comprising: a memory; and a processing device operatively coupled to the memory, to: receive a first data object for storing in an object repository of a storage platform; increase an encryption value of the object repository responsive to identifying that a current entropy level of the first data object exceeds a prior entropy level of the first data object by more than a first threshold value; and perform remediation on the object repository responsive to determining that the encryption value of the object repository exceeds a second threshold value.

Example 11 is the system of Example 10, wherein the first data object corresponds to an update to be performed on a second data object stored within the object repository, and wherein to perform the remediation on the object repository, the processing device is to create a copy of the second data object prior to storing the first data object in the object repository.

Example 12 is the system of any of Examples 10-11, wherein the object repository comprises a plurality of data objects, and wherein to perform the remediation on the object repository, the processing device is to create a copy of each of the data objects of the object repository prior to storing the first data object in the object repository.

Example 13 is the system of any of Examples 10-12, wherein to perform the remediation on the object repository, the processing device is to lock the object repository for further write access.

Example 14 is the system of any of Examples 10-13, wherein the first data object corresponds to an update to be performed on a second data object stored within the object repository, and wherein the prior entropy level is stored as part of metadata associated with the second data object.

Example 15 is the system of any of Examples 10-14, wherein the first data object is an immutable data object.

Example 16 is the system of any of Examples 10-15, wherein the object repository is a plurality of object repositories, each of the plurality of object repositories comprising a plurality of data objects distributed among a plurality of object storage daemons (OSDs), and wherein the first data object comprises a modification to a second data object of the plurality of data objects of one of the plurality of object repositories.

Example 17 is the system of any of Examples 10-16, wherein performing the remediation on the object repository comprises transmitting an alert to an administrator of the storage platform.

Example 18 is the system of any of Examples 10-17, wherein a higher current entropy level of the first data object corresponds to a higher level of randomness in data of the first data object.

Example 19 is a non-transitory computer-readable storage medium including instructions that, when executed by a processing device, cause the processing device to: receive a first data object for storing in an object repository of a storage platform; increase an encryption value of the object repository responsive to identifying that a current entropy level of the first data object exceeds a prior entropy level of the first data object by more than a first threshold value; and perform, by the processing device, remediation on the object repository responsive to determining that the encryption value of the object repository exceeds a second threshold value.

Example 20 is the non-transitory computer-readable storage medium of Example 19, wherein the first data object corresponds to an update to be performed on a second data object stored within the object repository, and wherein to perform the remediation on the object repository, the processing device is to create a copy of the second data object prior to storing the first data object in the object repository.

Example 21 is the non-transitory computer-readable storage medium of any of Examples 19-20, wherein the object repository comprises a plurality of data objects, and wherein to perform the remediation on the object repository, the processing device is to create a copy of each of the data objects of the object repository prior to storing the first data object in the object repository.

Example 22 is the non-transitory computer-readable storage medium of any of Examples 19-21, wherein to perform the remediation on the object repository, the processing device is to lock the object repository for further write access.

Example 23 is the non-transitory computer-readable storage medium of any of Examples 19-23, wherein the first data object corresponds to an update to be performed on a second data object stored within the object repository, and wherein the prior entropy level is stored as part of metadata associated with the second data object.

Example 24 is the non-transitory computer-readable storage medium of any of Examples 19-23, wherein the first data object is an immutable data object.

Example 25 is the non-transitory computer-readable storage medium of any of Examples 19-24, wherein the object repository is a plurality of object repositories, each of the plurality of object repositories comprising a plurality of data objects distributed among a plurality of object storage daemons (OSDs), and wherein the first data object comprises a modification to a second data object of the plurality of data objects of one of the plurality of object repositories.

Example 26 is the non-transitory computer-readable storage medium of any of Examples 19-25, wherein performing the remediation on the object repository comprises transmitting an alert to an administrator of the storage platform.

Example 27 is the non-transitory computer-readable storage medium of any of Examples 19-26, wherein a higher current entropy level of the first data object corresponds to a higher level of randomness in data of the first data object.

Example 28 is a system comprising: a memory; and a processing device operatively coupled to the memory, to: receive a first data object for storing in an object repository of a storage platform; scan the first data object to determine a current entropy level of the first data object; and perform remediation on the object repository responsive to determining that a comparison of the current entropy level of the first data object to a prior entropy level of the first data object exceeds a threshold value.

Example 29 is the system of Example 28, wherein the first data object is one of a plurality of data objects within the object repository of the storage platform, and wherein the processing device is further to increase an encryption value of the object repository responsive to identifying that the current entropy level is greater than the prior entropy level.

Example 30 is the system of any of Examples 28-29, wherein the first data object corresponds to an update to be performed on a second data object stored within the object repository, and wherein to perform the remediation on the object repository, the processing device is to create a copy of the second data object prior to storing the first data object in the object repository.

Example 31 is the system of any of Examples 28-30, wherein the object repository comprises a plurality of data objects, and wherein to perform the remediation on the object repository, the processing device is to create a copy of each of the data objects of the object repository prior to storing the first data object in the object repository.

Example 32 is the system of any of Examples 28-31, wherein to perform the remediation on the object repository, the processing device is to lock the object repository for further write access.

Example 33 is the system of any of Examples 28-32, wherein the first data object corresponds to an update to be performed on a second data object stored within the object repository, and wherein the prior entropy level is stored as part of metadata associated with the second data object.

Example 34 is the system of any of Examples 28-33, wherein the first data object is an immutable data object.

Example 35 is the system of any of Examples 28-34, wherein the object repository is a plurality of object repositories, each of the plurality of object repositories comprising a plurality of data objects distributed among a plurality of object storage daemons (OSDs), and wherein the first data object comprises a modification to a second data object of the plurality of data objects of one of the plurality of object repositories.

Example 36 is the system of any of Examples 28-35, wherein performing the remediation on the object repository comprises transmitting an alert to an administrator of the storage platform.

Example 37 is the system of any of Examples 28-36, wherein a higher current entropy level of the first data object corresponds to a higher level of randomness in data of the first data object.

Example 38 is the system of any of Examples 28-37, wherein performing the remediation on the object repository comprises limiting a rate of access to the object repository.

Example 39 is an apparatus comprising: means for receiving a first data object for storing in an object repository of a storage platform; means for increasing an encryption value of the object repository responsive to identifying that a current entropy level of the first data object exceeds a prior entropy level of the first data object by more than a first threshold value; and means for performing remediation on the object repository responsive to determining that the encryption value of the object repository exceeds a second threshold value.

Example 40 is the apparatus of Example 39, wherein the first data object corresponds to an update to be performed on a second data object stored within the object repository, and wherein the means for performing the remediation on the object repository comprises means for creating a copy of the second data object prior to storing the first data object in the object repository.

Example 41 is the apparatus of any of Examples 39-40, wherein the object repository comprises a plurality of data objects, and wherein the means for performing the remediation on the object repository comprises means for creating a copy of each of the data objects of the object repository prior to storing the first data object in the object repository.

Example 42 is the apparatus of any of Examples 39-41, wherein the means for performing the remediation on the object repository comprises means for locking the object repository for further write access.

Example 43 is the apparatus of any of Examples 39-42, wherein the first data object corresponds to an update to be performed on a second data object stored within the object repository, and wherein the prior entropy level is stored as part of metadata associated with the second data object.

Example 44 is the apparatus of any of Examples 39-43, wherein the first data object is an immutable data object.

Example 45 is the apparatus of any of Examples 39-44, wherein the object repository is a plurality of object repositories, each of the plurality of object repositories comprising a plurality of data objects distributed among a plurality of object storage daemons (OSDs), and wherein the first data object comprises a modification to a second data object of the plurality of data objects of one of the plurality of object repositories.

Example 46 is the apparatus of any of Examples 39-45, wherein the means for performing the remediation on the object repository comprises means for transmitting an alert to an administrator of the storage platform.

Example 46 is the apparatus of any of Examples 39-46, wherein a higher current entropy level of the first data object corresponds to a higher level of randomness in data of the first data object.

Example 47 is a system comprising: a memory; and a processing device operatively coupled to the memory, to: receive a first data object for storing in a first object repository of a plurality of object repositories, each of the object repositories comprising a plurality of existing data objects; calculate a first entropy level of the first data object; responsive to determining that the first data object corresponds to a second data object of the existing data objects, compare the first entropy level of the first data object to a second entropy level of the second data object; increase an encryption value of the first object repository responsive to determining that the first entropy level of the first data object differs from the second entropy level of the second data object by more than a first threshold value; and perform, by a processing device, remediation on the object repository responsive to determining that the encryption value of the first object repository is greater than a second threshold value.

Example 48 is the system of Example 47, wherein to perform the remediation on the first object repository, the processing device is to create a copy of the second data object prior to storing the first data object in the object repository.

Example 49 is the system of any of Examples 47-48, wherein to perform the remediation on the first object repository, the processing device is to create a copy of each of the existing data objects of the first object repository prior to storing the first data object in the first object repository.

Example 50 is the system of any of Examples 47-49, wherein to perform the remediation on the object repository, the processing device is to lock the first object repository for further write access.

Example 51 is the system of any of Examples 47-50, wherein the first data object corresponds to an update to be performed on the second data object, and wherein the second entropy level is stored as part of metadata associated with the second data object.

Example 52 is the system of any of Examples 47-51, wherein the first data object is an immutable data object.

Example 53 is the system of any of Examples 47-52, each of the plurality of object repositories comprises a plurality of data objects distributed among a plurality of object storage daemons (OSDs), and wherein the first data object comprises a modification to a second data object of the plurality of data objects of one of the plurality of object repositories.

Example 54 is the system of any of Examples 47-53, wherein performing the remediation on the first object repository comprises transmitting an alert to an administrator of the storage platform.

Example 55 is the system of any of Examples 47-54, wherein a higher value of the first entropy level of the first data object corresponds to a higher level of randomness in data of the first data object.

Example 56 is the system of any of Examples 47-55, wherein the first object repository is a bucket of a Ceph-based storage platform.

Unless specifically stated otherwise, terms such as "receiving," "increasing," "performing," "locking," "creating," "identifying," "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

receiving a first data object for storing in a first object repository of a storage platform, wherein the first data object corresponds to an update to be performed on an original second data object stored within the first object repository, and wherein the first object repository comprises a logical grouping of data objects;

identifying that a current entropy level of the first data object exceeds a prior entropy level of the original second data object by more than a first threshold value, wherein the original second data object stored within the first object repository comprises:
  metadata that stores the prior entropy level; and
  data;

increasing an encryption value of the first object repository responsive to identifying that the current entropy level of the first data object exceeds the prior entropy level of the original second data object by more than the first threshold value, wherein the encryption value is a rate at which the data objects within the first object repository are encrypted;

determining that the encryption value of the first object repository exceeds a second threshold value, wherein the second threshold value is an encryption rate threshold value; and performing, by a processing device, remediation on the first object repository responsive to determining that the encryption value of the first object repository exceeds the second threshold value, wherein performing the remediation on the first object repository comprises creating a copy of the second data object in a second object repository of the storage platform, and wherein the copy of the second data object has elevated access permissions compared to access permissions of the original second data object.

2. The method of claim 1, wherein performing the remediation on the first object repository comprises creating the copy of the second data object prior to storing the first data object in the first object repository.

3. The method of claim 1, wherein the first object repository comprises a plurality of data objects, and
wherein performing the remediation on the first object repository comprises creating a copy of each of the plurality of data objects of the first object repository prior to storing the first data object in the first object repository.

4. The method of claim 1, wherein performing the remediation on the first object repository comprises locking the first object repository for further write access.

5. The method of claim 1, wherein identifying that the current entropy level of the first data object exceeds the prior entropy level of the original second data object by more than the first threshold value, increasing the encryption value of the first object repository, and determining that the encryption value of the first object repository exceeds the second threshold value occur prior to storing the first data object in the first object repository of the storage platform.

6. The method of claim 1, wherein the first object repository is a plurality of object repositories, each of the plurality of object repositories comprising a plurality of data objects distributed among a plurality of object storage daemons (OSDs).

7. The method of claim 1, wherein the first data object and the original second data object are stored in a distributed format.

8. A system comprising:
a processing device; and
a memory, operatively coupled to the processing device, that stores instructions that, when executed by the processing device, cause the processing device to:
receive a first data object for storing in a first object repository of a storage platform, wherein the first data object corresponds to an update to be performed on an original second data object stored within the first object repository, and wherein the first object repository comprises a logical grouping of data objects;
identify that a current entropy level of the first data object exceeds a prior entropy level of the original second data object by more than a first threshold value, wherein the original second data object stored within the first object repository comprises:
metadata that stores the prior entropy level; and data;
increase an encryption value of the first object repository responsive to identifying that the current entropy level of the first data object exceeds the prior entropy level of the original second data object by more than the first threshold value, wherein the encryption value is a rate at which the data objects within the first object repository are encrypted;
determine that the encryption value of the first object repository exceeds a second threshold value, wherein the second threshold value is an encryption rate threshold value; and
perform remediation on the first object repository responsive to determining that the encryption value of the first object repository exceeds the second threshold value, wherein performing the remediation on the first object repository comprises creating a copy of the second data object in a second object repository of the storage platform, and wherein the copy of the second data object has elevated access permissions compared to access permissions of the original second data object.

9. The system of claim 8, wherein to perform the remediation on the first object repository, the instructions, when executed by the processing device, cause the processing device to create the copy of the second data object prior to storing the first data object in the first object repository.

10. The system of claim 8, wherein the first object repository comprises a plurality of data objects, and
wherein to perform the remediation on the first object repository, the instructions, when executed by the processing device, cause the processing device to create a copy of each of the plurality of data objects of the first object repository prior to storing the first data object in the first object repository.

11. The system of claim 8, wherein to perform the remediation on the first object repository, the instructions, when executed by the processing device, cause the processing device to lock the first object repository for further write access.

12. The system of claim 8, wherein to identify that the current entropy level of the first data object exceeds the prior entropy level of the original second data object by more than the first threshold value, increase the encryption value of the first object repository, and determine that the encryption value of the first object repository exceeds the second threshold value, the instructions, when executed by the processing device, cause the processing device to identify that the current entropy level of the first data object exceeds the prior entropy level of the original second data object by more than the first threshold value, increase the encryption value of the first object repository, and determine that the encryption value of the first object repository exceeds the second threshold value prior to storage of the first data object in the first object repository of the storage platform.

13. The system of claim 8, wherein the first object repository is a plurality of object repositories, each of the plurality of object repositories comprising a plurality of data objects distributed among a plurality of object storage daemons (OSDs).

14. The system of claim 8, wherein the first data object and the original second data object are stored in a distributed format.

15. A non-transitory computer-readable storage medium including instructions that, when executed by a processing device, cause the processing device to:
receive a first data object for storing in a first object repository of a storage platform, wherein the first data object corresponds to an update to be performed on an original second data object stored within the first object repository, and wherein the first object repository comprises a logical grouping of data objects;

identify that a current entropy level of the first data object exceeds a prior entropy level of the original second data object by more than a first threshold value, wherein the original second data object stored within the first object repository comprises:
- metadata that stores the prior entropy level; and
- data;

increase an encryption value of the first object repository responsive to identifying that the current entropy level of the first data object exceeds the prior entropy level of the original second data object by more than the first threshold value, wherein the encryption value is a rate at which the data objects within the first object repository are encrypted;

determine that the encryption value of the first object repository exceeds a second threshold value, wherein the second threshold value is an encryption rate threshold value; and perform, by the processing device, remediation on the first object repository responsive to determining that the encryption value of the first object repository exceeds the second threshold value, wherein performing the remediation on the first object repository comprises creating a copy of the second data object in a second object repository of the storage platform, and wherein the copy of the second data object has elevated access permissions compared to access permissions of the original second data object.

16. The non-transitory computer-readable storage medium of claim 15, wherein to perform the remediation on the first object repository, the instructions, when executed by the processing device, cause the processing device to create the copy of the second data object prior to storage of the first data object in the first object repository.

17. The non-transitory computer-readable storage medium of claim 15,
wherein the first object repository comprises a plurality of data objects, and wherein to perform the remediation on the first object repository, the instructions, when executed by the processing device, cause the processing device to create a copy of each of the plurality of data objects of the first object repository prior to storage of the first data object in the first object repository.

18. The non-transitory computer-readable storage medium of claim 15, wherein to perform the remediation on the first object repository, the instructions, when executed by the processing device, cause the processing device to lock the first object repository for further write access.

19. The non-transitory computer-readable storage medium of claim 15, wherein to identify that the current entropy level of the first data object exceeds the prior entropy level of the original second data object by more than the first threshold value, increase the encryption value of the first object repository, and determine that the encryption value of the first object repository exceeds the second threshold value, the instructions, when executed by the processing device, cause the processing device to identify that the current entropy level of the first data object exceeds the prior entropy level of the original second data object by more than the first threshold value, increase the encryption value of the first object repository, and determine that the encryption value of the first object repository exceeds the second threshold value prior to storage of the first data object in the first object repository of the storage platform.

20. The non-transitory computer-readable storage medium of claim 15, wherein the first data object and the original second data object are stored in a distributed format.

* * * * *